(12) United States Patent
Podshibyakin et al.

(10) Patent No.: US 10,732,477 B2
(45) Date of Patent: Aug. 4, 2020

(54) ELECTROCHROMIC DEVICE AND METHOD OF ITS MANUFACTURING

(71) Applicant: OKTOPOLYMER LLC, selo Uspenskoe, Odintsovskii Raion (RU)

(72) Inventors: Vitaly Alekseevich Podshibyakin, Rostov-na-Donu (RU); Evgeny Nikolaevich Shepelenko, Rostov-na-Donu (RU)

(73) Assignee: OKTOPOLYMER LLC, Selo Uspenskoe (RU)

( * ) Notice: Subject to any disclaimer, the term of this patent is extended or adjusted under 35 U.S.C. 154(b) by 0 days.

(21) Appl. No.: 16/008,352

(22) Filed: Jun. 14, 2018

(65) Prior Publication Data

US 2019/0285958 A1    Sep. 19, 2019

(30) Foreign Application Priority Data

Mar. 19, 2018  (EP) .................................... 18162454
May 16, 2018  (KR) ........................ 10-2018-0056155

(51) Int. Cl.
  *G02F 1/15*   (2019.01)
  *G02F 1/155*  (2006.01)
  (Continued)

(52) U.S. Cl.
  CPC ............... *G02F 1/155* (2013.01); *C09K 9/02* (2013.01); *G02F 1/1525* (2013.01);
  (Continued)

(58) Field of Classification Search
  CPC .......... G02F 1/15; G02F 1/1525; G02F 1/157; G02F 1/155; G02F 1/15165; G02F 2001/15145; G02F 2202/022
  (Continued)

(56) References Cited

U.S. PATENT DOCUMENTS 4,174,152 A   11/1979  Giglia et al.
4,448,493 A    5/1984  Matsudaira et al.
(Continued)

FOREIGN PATENT DOCUMENTS

EP    0 612 826 B1   10/2000
EP    2848670 A1      3/2015
(Continued)

OTHER PUBLICATIONS

Russian Office Action and Search Report dated Apr. 24, 2019 in counterpart application No. RU 2019106480/05; with English translation (total 18 pages) (D1, RU264558, D8, RU2524963, and D10, RU2144937 cited in the Russian Office Action are not listed in this IDS since they were already listed in the IDS filed Jun. 14, 2018 and Mar. 19, 2019, respectively).

(Continued)

*Primary Examiner* — Mahidere S Sahle
(74) *Attorney, Agent, or Firm* — Seckel IP, PLLC (57) ABSTRACT

This group of inventions relates to a field of applied electric chemistry, namely, devices based on modified electrochromic compounds and method of their manufacturing, more specifically, to electrochromic devices comprising electrodes, at least one of which is optically transparent, said electrodes forming an enclosed space filled with a solution which includes an aprotic inert solvent, or their mixtures, an acrylic and/or methacrylic unsaturated oligomer-monomer composition, a cathodic material comprising pyridine, an anodic material, a photo initiator, an adhesive and indifferent electrolytes. According to the invention, the electrochromic solution also comprises an optical brightener selected from the range of aromatic or heterocyclic series and/or their mixtures, an antioxidant selected from the range of sterically hindered phenols and/or their mixtures. The achieved tech- (Continued)

nical result is increased service life of the electrochromic device.

14 Claims, 1 Drawing Sheet

(51) Int. Cl.
*G02F 1/1523* (2019.01)
*C09K 9/02* (2006.01)
*G02F 1/153* (2006.01)
*G02F 1/161* (2006.01)

(52) U.S. Cl.
CPC ............ *G02F 1/1533* (2013.01); *G02F 1/161* (2013.01); *G02F 2001/164* (2019.01)

(58) Field of Classification Search
USPC .......................... 359/265, 275, 267, 273, 270
See application file for complete search history.

(56) References Cited

U.S. PATENT DOCUMENTS

| | | | |
|---|---|---|---|
| 4,902,108 | A | 2/1990 | Byker |
| 5,888,431 | A | 3/1999 | Tonar et al. |
| 5,964,903 | A | 10/1999 | Gao et al. |
| 6,002,511 | A | 12/1999 | Varaprasad et al. |
| 6,118,573 | A | 9/2000 | Kubo et al. |
| 6,154,306 | A | 11/2000 | Varaprasad et al. |
| 6,416,905 | B1 | 7/2002 | Bronstert et al. |
| 7,118,694 | B2 | 10/2006 | Bronstert et al. |
| 7,202,987 | B2 | 4/2007 | Varaprasad et al. |
| 7,288,217 | B2 | 10/2007 | Hareyama et al. |
| 7,295,361 | B2 | 11/2007 | Gavrilov et al. |
| 2007/0008603 | A1 | 1/2007 | Sotzing et al. |
| 2010/0229950 | A1 | 9/2010 | Kuang et al. |
| 2013/0063802 | A1 | 3/2013 | Varaprasad et al. |
| 2013/0180591 | A1 | 7/2013 | Kawata et al. |
| 2015/0353819 | A1 | 12/2015 | Vasiliev et al. |
| 2016/0231636 | A1 | 8/2016 | Biver et al. |

FOREIGN PATENT DOCUMENTS

| | | |
|---|---|---|
| JP | H07-070218 A | 3/1995 |
| JP | 2001-521676 A | 11/2001 |
| JP | 2009-527074 A | 7/2009 |
| JP | 2013-545221 A | 12/2013 |
| KR | 10-0563889 B1 | 3/2006 |
| KR | 102050159 B1 | 11/2019 |
| RU | 814288 A3 | 3/1981 |
| RU | 2 144 937 C1 | 1/2000 |
| RU | 2213395 C2 | 9/2003 |
| RU | 2 224 275 C1 | 2/2004 |
| RU | 2249606 C2 | 4/2005 |
| RU | 2310935 C2 | 11/2007 |
| RU | 2356131 C1 | 5/2009 |
| RU | 100 309 U1 | 12/2010 |
| RU | 2524963 C1 | 8/2014 |
| RU | 2 642 558 C1 | 1/2018 |
| RU | 2711654 C1 | 1/2020 |
| SU | 722219 A1 | 8/1977 |
| WO | 98/48469 A1 | 10/1998 |
| WO | 00/66676 A1 | 11/2000 |
| WO | 2007/008978 A2 | 1/2007 |
| WO | 2007/093961 A1 | 8/2007 |
| WO | 2012/041437 A2 | 4/2012 |

OTHER PUBLICATIONS

"Antioxidants", in Chemical encyclopedia, vol. 3 (Med—Pol), Scientific Publishing House, Moscow, 1992, p. 179 (with English translation; total 4 pages).

"Optical Brighteners", in Chemical encyclopedia, vol. 1 (Abl-Dar), Scientific Publishing House, Moscow, 1988, pp. 422-423 (with English translation; total 6 pages).

Korean Office Action dated Apr. 15, 2019 in counterpart application No. KR 10-2018-0056155; with English translation (total 14 pages).

European Search Report and Written Opinion dated Aug. 30, 2018 in counterpart application No. EP18162454; in English (4 pages) (D1, RU2642558 cited in the ESR is not listed in this IDS since it was already listed in the IDS filed Jun. 14, 2018).

Korean Notice of Allowance dated Oct. 28, 2019 in counterpart application No. KR 10-2018-0056155; with English translation (total 3 pages) (Documents D1-D4 cited in the Korean Notice of Allowance are not listed in this IDS since they were already listed in the IDS filed Jul. 8, 2019).

Russian Notice of Allowance dated Oct. 22, 2019 in counterpart application No. RU 20190106480; with English machine translation (total 15 pages) (Documents D1-D11 cited in the Russian Notice of Allowance are not listed in this IDS since they were already listed in the IDSs filed Jun. 14, 2018, Mar. 19, 2019, and Jul. 8, 2019, respectively).

European Notice of Allowance dated Feb. 28, 2020 in counterpart application No. EP 20180162454; with bibliographic data and text intended for grant; in English (total 38 pages).

# ELECTROCHROMIC DEVICE AND METHOD OF ITS MANUFACTURING

TECHNICAL FIELD OF INVENTION

This group of inventions relates to a field of applied electric chemistry, namely, devices based on modified electrochromic compounds and method of their manufacturing, more specifically, to electrochromic devices comprising two electrodes, at least one of which is optically transparent, said electrodes forming an enclosed space filled with a solution which includes an aprotic inert solvent or their mixtures, an acrylic and/or methacrylic unsaturated oligomer-monomer composition, a cathodic material comprising pyridine, an anodic material, a photo initiator, an adhesive and indifferent electrolytes. This group of inventions can be used, in particular, for manufacturing of various light filters, architectural and vehicle mirrors and windows with electrically controlled light transmission.

This paper uses the following terms and definitions.

Acrolat, or ready-to-use unsaturated oligomer-monomer photocurable composition, which are, in essence, a mixture of plasticizing agent, oligomer and monomer reactants and photo initiator, It is preferable to use unsaturated oligomer monomer photocurable compositions normally utilized for manufacturing of impact-resistant triplex glasses for vehicles and construction applications. These are Acrolat 19 (according to Technical Specification TU 2243-069-10488057-2012) manufactured by "NPP Macromer" Ltd (Vladimir, Russia).
http://macromer,ru/product/glass/akrolat-18/

DRS-250, or a mercury bulb arc lamp. Mercury quartz lamps are used in optical devices to obtain a high-intensity narrow light beam. These lamps radiate energy both in the visible and the ultraviolet spectrum.
http:/scopica.ru/proj/rtutnaya-lampa-sverhvyisokoao-davleniya-drsh-250-3/

% Vol., per cent by volume,

M, moles,

ITO, or Indium tin oxide, a semiconductor material which is transparent to visible light thanks to a wide band gap (about 4 eV) but capable of reflecting IR light.

UV, or ultraviolet.

Prior Art

The U.S. Pat. No. 4,902,108 discloses a method of filling two optically transparent electrodes with polymethyl methacrylate mixed with low boiling solvent, said filler having a predetermined film thickness, Then the enclosed space so formed is filled with an electrochromic solution which comprises a cathodic and an anodic components and an indifferent electrolyte in a high boiling solvent. Electrochromic devices based on solid state gel organic compounds are known. (See Russian patents RU2144937; RU2224275; RU100309). The drawbacks of io such systems include: an hydrostatic internal pressure, an acidic medium (presence of carboxyl groups in the polymer chain may lead to the formation of dyed protonated varieties of anodic components), a compound phase separation. The combination of all the above drawbacks renders the task of obtaining a long life gel electrochromic compound and derivative devices extremely difficult.

Electrochromic devices based on a polymeric matrix with an electrochromic solution interspersed therein, see U.S. Pat. No. 5,888,431. A creation of such solid-state matrix is made difficult by a number of intricacies specific to the process. Line prepolymer is first dissolved in an organic solvent. This semi-product is diluted with solution of electrochromic components and additives which include an agent for prepolymer chain linking and an initiator, to lower its viscosity. The volume matrix is formed directly in the device.

A method of manufacturing of electrochromic devices based on solid polymer films is also known. See U.S. Pat. No. 6,002,511; U.S. Pat. No. 7,202,987; US2013063802. Solid films are formed inside an enclosed inter-electrode space under the influence of electromagnetic radiation, particularly, ultraviolet light. Polymer electrochromic compound formation process is characterized by difficulties in initiating radical polymerization. If polymerized compounds are subjected to ultraviolet light, the initiation process is made much more difficult if the compound includes electrochromic components with considerable light absorption in the photo initiator sensitivity range. Therefore, a possibility of setting initiation under the influence of electromagnetic radiation in a broad wavelength range was considered. However, the diversity of electrochromic monomer compositions renders it impossible to develop an all-purpose method for formation of polychromatic solid film due to a specific nature of electromagnetic radiation spectra.

The U.S. Pat. No. 7,202,987 describes a combination of ultraviolet polymerization and thermal effect as an additional source of energy for acceleration of setting processes, The closest prior art is the Russian invention patent RU2642558 published in 2018 which discloses an electrochromic device comprising two electrodes, at least one of which is optically transparent, said electrodes forming an enclosed space filled with a solution which includes an aprotic inert solvent or their mixtures, ac an acrylic and/or methacrylic unsaturated oligomer-monomer composition, a cathodic material comprising pyridine, an anodic material, a photo initiator, an adhesive and indifferent electrolytes.

This prior art also discloses a method of manufacturing of the electrochromic device comprising two electrodes, at least one of which is optically transparent, said method including following stages which involve: obtaining a true electrochromic solution of a cathodic electrochromic component, an anodic electrochromic component, a photo initiator, an adhesive, an indifferent electrolyte, an unsaturated oligomer-monomer composition in an inert aprotic solvent; filling an enclosed space between the electrodes with the true electrochromic solution; creating the sealed enclosed space between the electrodes filled with the true electrochromic solution; polymerizing the electrochromic solution by an electromagnetic radiation in the visible and/or ultraviolet spectral range to ensure a transition of the molecules of at least one of the electrochromic components to an excited state and a transition of oxygen from a free active state into a bound inactive state; thermally influencing the activated true electrochromic solution to obtain a solid-state electrochromic layer comprising a crosslinked polymer matrix with the filler in the form of the electrochromic solution.

A drawback of the prototype as both a device and a method is low service life of the electrochromic device. Another drawback is low plasticity and resilience of the polymer matrix,

Disclosure of the Invention as a Device

This invention, on the one side, has a primary aim to offer an electrochromic device comprising two electrodes, at least one of which is optically transparent, said electrodes forming an enclosed space filled with a solution which includes an aprotic inert solvent, an unsaturated oligomer-monomer composition, a cathodic electrochromic component, an anodic electrochromic component, a photo initiator, an adhesive and indifferent electrolytes, said device serves at least to mitigate one of the aforementioned drawbacks, namely, to extend the service life of the electrochromic device, which is the technical objective.

For the purpose of reaching the above objective, the solution also includes ac an optical brightener selected from the range of aromatic or heterocyclic series and/or their mixtures and an antioxidant selected from the range of sterically hindered phenols and/or their mixtures.

This useful features make it possible to extend the service life of the electrochromic device, as the antioxidant prolongs the service life. The optical brightener prolongs the service life too.

There is a version of the invention in that the solution comprises a polymer selected from the following range: polystyrene, polymethyl methacrylate, polyethylene terephthalate, polyvinyl pyrrolidone, their derivatives and/or their mixtures.

This useful feature makes it possible to leverage the advantages of polymer, namely, the improvement of mechanical properties of the polymerized composition.

There is a version of the invention in that the solution comprises a plasticizer selected from the following range: crown ethers and phthalic acid ethers and/or their mixtures.

This useful feature makes it possible to leverage the advantages of plasticizer, namely, its addition to the polymer to increase elasticity or plasticity and resilience of the polymer matrix.

There is a version of the invention in that the solution comprises the optical brightener in the range from 0.001M to 0.002M.

This useful feature makes it possible to specify the range of optical brightener content and to determine which levels condition the most marked effect of extending the service life of the electrochromic device.

There is a version of the invention in that the solution comprises the antioxidant in the range from 0.001M to 0.002M.

This useful feature makes it possible to specify the range of antioxidant content and to determine which levels condition the most marked effect of extending the service life of the electrochromic device.

There is a version of the invention in that the solution comprises the polymer in the range from 1 Vol. % to 20 Vol. %.

This useful feature makes it possible to specify the range of polymer content and to determine which levels condition the most marked effect of ac increase in elasticity or plasticity and resilience of the polymer matrix of the electrochromic device.

There is a version of the invention in that the solution comprises the plasticizer in the range from 1 Vol. % to 5 Vol. %.

This useful feature makes it possible to specify the range of plasticizer content and to determine which levels condition the most marked effect of increase in elasticity or plasticity and resilience of the polymer matrix of the electrochromic device, The above levels are selected for the reason that lower concentrations do not produce a visible effect on the properties of the device.

Higher concentrations may bring about solubility and polymerization problems.

The combination of the essential features of the claimed invention is unknown from the prior art, therefore the invention as a device possesses the required feature of novelty. Furthermore, the composition of components is not evident to those skilled in the art, therefore the invention as a device has a required feature of inventive step, Disclosure of the Invention as a Method This invention, on the other side, has a primary aim to offer a method of manufacturing of an electrochromic device comprising two electrodes, at least one of which is optically transparent, said method including following stages which involve: obtaining a true electrochromic solution of a cathodic electrochromic component, an anodic electrochromic component, a photo initiator, an adhesive, an indifferent electrolyte, an unsaturated oligomer-monomer composition in an inert aprotic solvent; filling an enclosed space between the electrodes with the true electrochromic solution; creating the sealed enclosed space between the electrodes filled with the true electrochromic solution; polymerizing the electrochromic solution by an electromagnetic radiation in the visible and/or ultraviolet spectral range to ensure a transition of the molecules of at least one of the electrochromic components to an excited state and a transition of oxygen from a free active state into a bound inactive state; thermally influencing the activated true electrochromic solution to obtain a solid-state electrochromic layer comprising a cross-linked polymer matrix with the filler in the form of the electrochromic solution, said method serves at least to mitigate one of the aforementioned drawbacks, namely, to extend the service life of the electrochromic device, which is the technical objective.

For the purpose of reaching the above objective, the solution includes an optical brightener selected from the range of aromatic or heterocyclic series and/or their mixtures, an antioxidant selected from the range of sterically hindered phenols and/or their mixtures.

This useful features make it possible to extend the service life of the electrochromic device, as the antioxidant prolongs the service life. The optical brightener prolong the service life too. In addition, it allows to increase a light transmission up to 82%.

There is a version of the invention in that the solution comprises a polymer selected from the following range: polystyrene, polymethyl methacrylate, polyethylene terephthalate, polyvinyl pyrrolidone, their derivative and/or their mixtures.

This useful feature makes it possible to leverage the advantages of polymer, namely, the improvement of mechanical properties of the polymerized composition.

There is a version of the invention in that the solution comprises a plasticizer selected from the following range: crown ethers and phthalic acid ethers and/or their mixtures.

This useful feature makes it possible to leverage the advantages of plasticizer, namely, its addition to the polymer to increase elasticity or plasticity and resilience of the polymer matrix.

There is a version of the invention in that the solution comprises the optical brightener in the range from 0.001M to 0.002M.

This useful feature makes it possible to specify the range of optical brightener content and to determine which levels condition the most marked effect of extending the service life of the electrochromic device.

There is a version of the invention in that the solution comprises the antioxidant in the range from 0.001M to 0.002M.

This useful feature makes it possible to specify the range of antioxidant content and to determine which levels condition the most marked effect of extending the service life of the electrochromic device.

There is a version of the invention in that the solution comprises the polymer in the range from 1 Vol. % to 20 Vol. %.

This useful feature makes it possible to specify the range of polymer content and to determine which levels condition the most marked effect of increase in elasticity or plasticity and resilience of the polymer matrix of the electrochromic device.

There is a version of the invention in that the solution comprises the plasticizer in the range from 1 Vol. % to 5 Vol. %.

This useful feature makes it possible to specify the range of plasticizer content and to determine which levels condition the most marked effect of increase in elasticity or plasticity and resilience of the polymer matrix of the electrochromic device.

The combination of the essential features of the claimed invention is unknown from the prior art, therefore the invention as a method possesses the required feature of novelty. Furthermore, the composition of components is not evident to those skilled in the art, therefore the invention as a method has a required feature of inventive step.

BRIEF DESCRIPTION OF DRAWINGS

Other distinguishing features and advantages of the invention are readily apparent from the description below which includes but is not limited to the following features, with reference to the figures attached:

FIG. 2 is a diagram showing the stages of the method according to the invention, The FIG. 1 shows:
1—a solid liner with electroconduc ive coating;
2—a spacer;
3—contacts;
4—butyl rubber sealing compound;
5—polysulfide sealing compound;
6—solution (electrochromic composition).

EMBODIMENT OF THE INVENTION AS A DEVICE

An electrochromic device comprises two electrodes, at least one of which is optically transparent; said electrodes forming an enclosed space filled with a solution which includes:

- an aprotic inert solvent, as well as their mixtures, from 30 Vol. % to 70 Vol. % (propylene carbonate, dimethyl formamide, sulfurane, dimethyl sulfoxide, ethoxyethanol, polyester, ethylene carbonate, diethyl carbonate, fluoroethylene carbonate, dimethyl carbonate, dipropyl carbonate, dimethyl sulfoxide, acetonitrile, dimethoxyethane, diethoxyethane, tetrahydrofuran, N-methyl-2-pyrrolidone, ethylmethyl carbonate, gamma-butyrolactone, methyl formiate, propylacetate, ethylformiate, propylformiate, methylacetate, ethylacetate, pentylacetate, methylpropionate, ethylpropionate, propylpropionate and butylpropionate);
- an unsaturated oligomer-monomer composition (and/or a methacrylic unsaturated oligomer-monomer composition, from 30 Vol. % to 70 Vol;
- a cathodic electrochromic component (for example, a cathodic material comprising pyridine, said material having at least one reversible current-voltage reduction wave on polarograms (perchlorates; 4,4'-dipyridinium, 2,2'-dipyridinium, bis-1,1'-dipyridinium with an alkylene group linking nitrogen atoms with 1-10 carbon atoms, bis-2,2'-pyridinium or bis 4,4'-pyridinium tetrafluoroborates or hexafluorophosphates with a linking phenylene group or ketogroup), from 0.001M to 0.2M);
- an anodic electrochromic component (for example, the anodic material having at least one reversible current-voltage oxidation wave on polarograms (ferrocene, its derivatives and their mixtures, ferrocene oil; 5,10-dihydro-5,10-dimethylphenazine, its derivatives or their mixtures; phenothiazines, phenoxazines, benzothiazoles, their derivatives or their mixtures), from 0.001M to 0.2M);
- a photo initiator (benzoin, benzyl ketals, aroylphosphine oxides, amino alkyl phenons, aliphatic and aromatic ketones and their mixtures), from 0.001M to 0.020M;
- an adhesive (organofunctional silanes), from 1 Vol. % to 10% Vol. %;
- indifferent electrolytes (perchlorates, tetrafluoroborates, hexafluorophosphates or triphenylcyanborates of alkaline or alkaline earth metals, tetraalkylammonium with alkyl groups with 1-4 carbon atoms, as well as their mixtures), from 0.005M to 0.5M;
- an optic brightener (from aromatic or heterocyclic series, as well as their mixtures), from 0.001 M to 0.002M;
- an antioxidant (from the class of sterically hindered phenols, as well as their mixtures), from 0.001M to 0.002M;
- a plasticizer (crown ethers and phthalic acid ethers, as well as their mixtures), from 0.1 Vol. % to 5 Vol. %;
- a polymer selected from the following range: polystyrene, polymethyl methacrylate, polyethylene terephthalate, polyvinyl pyrrolidone, their derivative and/or their mixtures.

The use of mixed compositions serves to create a variety of spectral characteristics or colors and shades of the electrically activated state of the electrochromic layer in the inter-electrode space. The concentrations of cathodic and anodic components are determined by the type of electrochromic device and given electrical and optic parameters, so they may range from 0.001M to 0.2M.

The cathodic electrochromic component is an individual electrochromic compound or a mixture of organic compounds capable of reversible reduction in the cathodic potentials area.

Such organic compounds are quaternary salts of dipyridinium, perchlorates, 4,4'-dipyridinium, 2-2'-dipyridinium, bis-1,1'-dipyridinium with an alkylene group linking nitrogen atoms with 1-10 carbon atoms, bis-2,2'-pyridinium or bis 4,4'-pyridinium tetrafluoroborates or hexafluoroborates with a linking phenylene group or ketogroup.

Alkyl groups with 1-10 carbon atoms, phenyl and benzyl groups which, in io their turn, may comprise alkyl substitutions in positions 2, 3, 4, 5, 6 (carbon atoms 1-4), diverse halogenides (Cl, Br, I) may be used as quaternizing groups of pyridine rings. Alcoxy and cyano groups, alkylene linking groups with 2-4 carbon atoms for 2,2'-dipyridinium derivatives can also be used. Pyridine rings can also comprise substitutes (listed above), provided that each one of them differs from any other in positions 2,3,4,5.

The anodic electrochromic component is an individual electrochromic compound or a mixture of organic compounds capable of reversible reduction in the anodic potentials area.

Anodic electrochromic components include ferrocene and its derivatives comprising several independent from each other substitutes in the cyclopentadienil ring. Such substitutes are alkyl groups with 1-10 carbon atoms, phenyl groups, alkylphenyl groups with 1-4 carbon atoms in the alkyl group, alcoxy groups with 1-10 carbon atoms, alcoxyphenyl groups with 1-4 carbon atoms in the alcoxy group, benzyl groups, alkyl benzyl groups with 1-4 carbon atoms in the alkyl group, halogenidephenyl groups, phenylcarboxyl groups, nitrophenyl groups, carboxamide groups, acyl groups, ariloyl groups or acyl(aril)alkyl groups.

1,1-diethyl ferrocene or ferrocene oil can also be used.

Besides, tertiary alkyl amines or alkyl arilyl amines as well as heterocyclic compounds from the class of phenazines, phenoxazines, phenothiazines can also be used as anodic electrochromic component. Anodic electrochromic component may be in the form of 5,10-dihydro-5,10-dimethylphenazine, its derivatives or their mixtures.

The following compounds can be used as the inert aprotic solvent: propylene carbonate, dimethyl formamide, sulfurane, dimethyl sulfoxide, ethoxyethanol, polyester, ethylene carbonate, diethyl carbonate, fluoroethylene carbonate, dimethyl carbonate, dipropyl carbonate, dimethyl sulfoxide, acetonitrile, dimethoxyethane, diethoxyethane, tetrahydrofuran, N-methyl-2-pyrrolidone, ethylmethyl carbonate, gamma-butyrolactone, methyl formiate, propylacetate, ethylformiate, propylformiate, methylacetate, ethylacetate, pentylacetate, methylpropionate, ethylpropionate, propylpropionate and butylpropionate and their mixtures. Concentrations may vary from 30 Vol. % to 70 Vol. %, preferably: 40 Vol. %-60%.

It is preferable to use an acrylic unsaturated oligomer-monomer composition and/or methacrylic unsaturated oligomer-monomer composition as the unsaturated oligomer-monomer composition.

To obtain said true solution, the acrylic and/or methacrylic unsaturated oligomer-monomer composition and the photo initiator are joined together as a compound. Concentrations may vary from 30 Vol. % to 70 Vol. %, preferably: 40 Vol. 60 Vol. %

Thermal and photochemical initiators, as well as their mixtures may be used as polymerization initiators. For example, 2,2-dimethoxy-1,2-diphenylethane-1-on or 1-hydroxy-cyclohexyl-phenyl-ketone may be used in the amount sufficient to polymerize the true solution.

Silicate glass or polymer plates are used as solid liners for the electrodes. The polymer material for the plates is selected from the group comprising polyimide, polyethylene terephthalate and polycarbonate.

Electroconductive coatings from doped transition metal oxides on solid liners are used as the electrodes.

The electroconductive coating may be selected from the group comprising spacered indium oxide $In_2O_3$:$SnO_2$, doped tin oxide $SnO_2$:F or doped zinc oxide ZnO:Ga.

A gap between the electrodes in the electrochromic device equals to 0.03-1 preferably 0.04-0.6 mm.

A variety of additives may be introduced to the true electrochromic solution to obtain an electrochromic device resistant to mechanical, physical and chemical impacts, To obtain a required ion conductivity of the solid-state layer, indifferent electrolytes may be introduced to the original electrochromic solution to stabilize electrically activated varieties of the electrochromic components under high temperatures during long polarization by direct voltage and under increased voltages. Electrolytes serve to increase the reversibility of coloration/discoloration processes, especially in larger electrochromic devices. Indifferent electrolytes may be organic and inorganic salts: perchlorates, tetrafluoroborates, hexafluorophosphates or triphenylcyanborates of alkaline or alkaline earth metals, tetraalkylammonium with alkyl groups with 1-4 carbon atoms, as well as their mixtures. The amount of added electrolytes may be 0.005M-0.5M, preferably –0.01M-0.1M.

Crown ethers and phthalic acid ethers are used as additional plasticizers which leads to increased ion conductivity of the polymer matrix and, as a result, accelerates the electrochromic device. The amount of added plasticizers may range from 0.1 Vol. % to 5 Vol. %.

For the purpose of improvement of physical properties of the resulting compound (adhesion, cohesion and related plasticity and resilience of the polymer matrix with space-network structure), true electrochromic solutions may additionally comprise additives from organic compounds from the silane group (organofunctional silane), which are used as structuring and crosslinking agents, surface modifiers and adhesion promoters, improving physical properties and thermal stability. The preferred compounds are 3-methacryloxypropyl trimethoxysilane and 3-glycydoxypropyl trimethoxysilane. Concentration of structuring additives, which are, in essence, organofunctional silanes, may range from 1 Vol. % to 10 Vol. %.

To protect electrochromic compound from oxidants, including adsorbed air oxygen, sterically hindered phenols were additionally introduced. Concentration of protective additives may range from 0.001M to 0.002M.

To protect the electrochromic device from short wavelength ultraviolet radiation and to brighten the polymer matrix, optical brighteners from the aromatic and heterocyclic series were introduced. Their concentration ranges from 0.001M to 0.002M.

To obtain a higher-density electrochromic solution and a film-electrolyte with a more plastic and resilient polymer matrix, ready-to-use polymer compositions may be added. These include polystyrene, polymethyl methacrylate, polyethylene terephthalate, polyvinyl pyrrolidone, their derivatives and mixtures. Their amount may range from 1 Vol. % to 20 Vol. %, preferably 5 Vol. %-10 Vol. %.

Embodiment of the Invention as a Method

Figure 1:
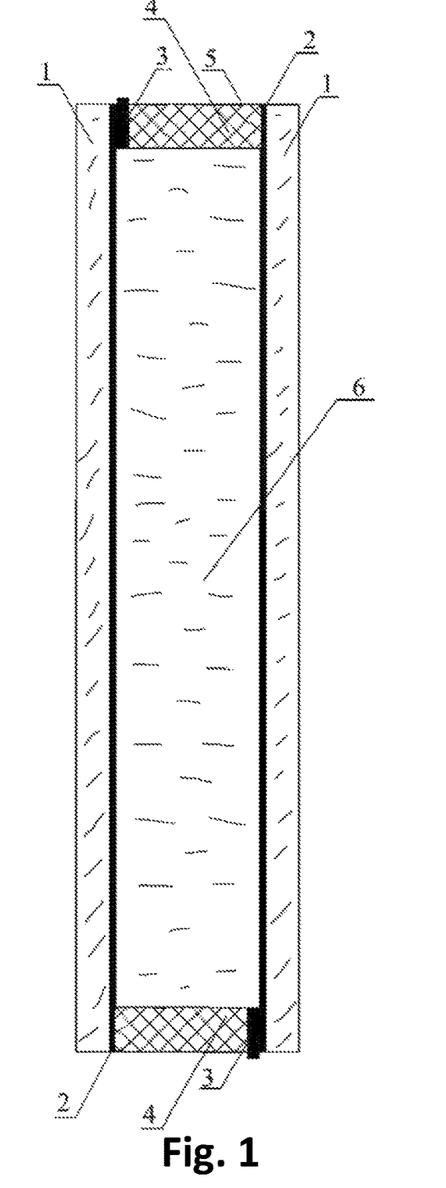
FIG. 1 is a diagram of the electrochromic device according to the invention.
Figure 2:
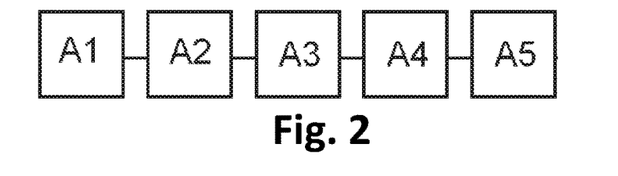

A method of manufacturing of an electrochromic device comprising two electrodes at least one of which is optically transparent, said method including following stages which involves, according to FIG. 2:

Stage A1 Obtaining a true electrochromic solution of
a cathodic electrochromic component,
an anodic electrochromic component,
a photo initiator,
an adhesive,
an indifferent electrolyte,
an unsaturated oligomer-monomer composition,
in an inert aprotic solvent;
an optic brightener from 0.001M to 0.002M which is selected from aromatic or heterocyclic series and/or their mixtures,
an antioxidant from 0.001M to 0.002M which is selected from the class of sterically hindered phenols and/or their mixtures,
a polymer from 1 Vol. % to 20 Vol. %. which is selected from the following range: polystyrene, polymethyl metacrylate, polyethylene terephthalate, polyvinyl pyrrolidone, their derivatives and/or their mixtures, and a plasticizer from 1 Vol. % to 5 Vol. % which is selected from crown ethers and phthalic acid ethers and/or their mixtures.

Stage A2. Filling an enclosed space between the electrodes with the true electrochromic solution.

Stage A3. Creating the sealed enclosed space between the electrodes filled with the true electrochromic solution.

Stage A4. Polymerizing the electrochromic solution by electromagnetic radiation in the visible and/or ultraviolet spectral range to ensure a transition of molecules of at least one of the electrochromic components to an excited state and a transition of oxygen from a free active state to the bound inactive state.

Stage A5. Thermally influencing the activated true electrochromic solution to obtain a solid-state electrochromic layer comprising a crosslinked polymer matrix with the filler in the form of the electrochromic solution.

INDUSTRIAL APPLICABILITY

According to the invention, industrial prototypes were manufactured, see examples below.

EXAMPLE 1

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
an anodic electrochromic component: 0.008M of 5,10-dihydro-5,10-dimethyl phenazine,
a cathodic electrochromic component: 0.010M of 1,1'-dibenzyl-4,4'-dipyridinium diperchlorate and 010030M of 1,1''-(1,3-propanediyl)bis[1'-methyl-4,4'bipyridinium] tetraperchlorate,
an indifferent electrolyte: 0.015M of lithium perchlorate and 0.005M tetrabutyl ammonium perchlorate,
a photo initiator: 0.005M of 2,2-dimethoxy-1,2-diphenylethane-1-on.
an adhesive: 2 Vol. % of 3-methacryloxypropyl trimethoxysilane,
an optic brightener: 0.001 M of terphenyl,
a plasticizer: 3 Vol. % of diethyl phthalate.

The internal volume of the device was filled with the original electrochromic solution under pressure, i.e. the solution was not filled by gravity but by the application of force.

After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 82%. After the voltage of 1V was applied, the io device acquired the black color, while light transmission was 10%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 2

An electrochromic device has been manufactured, said device comprising two optically transparent ITO electrodes, having surface resistance of 30 Ohm/square, the thickness of the glass liner being 4 mm. The size of the electrodes was 148×210 mm, The inter-electrode space was formed by a butyl rubber-based sealing compound; 0.4 mm thick nylon twine was used as spacer.

The electrochromic solution included;
an inert aprotic solvent: 50 Vol. % of propylene carbonate
a methacrylic unsaturated oligomer-monomer composition; 45 Vol. % of Acrolat 18,
an anodic electrochromic component: 0.008M of 5,10-dihydro-5,10-dimethyl phenazine,
a cathodic electrochromic component: 0.010M of 1,1'-dibenzyl-4,4'-dipyridinium diperchlorate and 0.0030M of 1,1''-(1,3-propanediyl)bis[1'-methyl-4,4'bipyridinium] tetraperchlorate,
an indifferent electrolyte: 0.015M of sodium perchlorate, 0.005M tetrabutyl ammonium perchlorate and 0.015M of sodium tetrafluoroborate,
a photo initiator: 0.005M of 2,2-dimethoxy-1,2-diphenylethane-1-on,
an adhesive: 2 Vol. % of 3-methacryloxypropyl trimethoxysilane,
an optic brightener: 0.001 M of terphenyl,
a plasticizer; 3 Vol. % of diethyl phthalate.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum io range before and after radiation was 82%. After the voltage of 1V was applied, the device acquired the black color, while light transmission was 10%, and the time of coloring/discoloration was 1.5 and 2 minutes, respectively. When the device was conditioned under the UV light from DRS-250 lamp for 30 minutes, no changes were registered. When the device was opened, the electrochromic layer looked like a solid-state polymer film.

EXAMPLE 3

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate,
a methacrylic unsaturated oligomer-monomer composition: 45 Vol. % of Acrolat 18,
an anodic electrochromic component: 0.008M of 5,10-dihydro-5,10-dimethyl phenazine,
a cathodic electrochromic component: 0.010M of 1,1'-dibenzyl-4,4'-dipyridinium diperchlorate and 0.0030M of 1,1''-(1,3-propanediyl)bis[1'-methyl-4,4'bipyridinium] tetraperchlorate, an indifferent electrolyte: 0.015M of lithium perchlorate and 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
an optic brightener: 0.001 M of terphenyl,
a plasticizer: 3 Vol. % of diethyl phthalate,
an antioxidant: 0.001M of ionol.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 82%. After the voltage of 1V was applied, the device acquired the black color, while light transmission was 10%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 4

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer. The electrochromic solution included:
an inert aprotic solvent: 50 Vol. % of propylene carbonate,
a methacrylic unsaturated oligomer-monomer composition: 45 Vol. % of Acrolat 18,
an anodic electrochromic component: 0.008M of 5,10-dihydro-5,10-dimethyl phenazine,
a cathodic electrochromic component: 0.010M of 1,1'-dibenzyl-4,4'-dipyridinium diperchlorate and 0.0030M of 1,1"-(1,3-propanediyl)bis[1'-methyl-4,4'bipyridinium] tetraperchlorate,
an indifferent electrolyte: 0.015M of sodium perchlorate, 0.005M tetrabutyl ammonium perchlorate and 0.015M of sodium tetrafluoroborate,
a photo initiator: 0.005M of 2,2-dimethoxy-1,2-diphenylethane-1-on,
an adhesive: 2 Vol. % of 3-methacryloxypropyl trimethoxysilane,
an optic brightener: 0.001M of terphenyl,
a plasticizer: 3 Vol. % of diethyl phthalate,
an antioxidant: 0.001M of ionol.

The internal volume of the device was filled with the original electrochromic solution under pressure. After filling, the opening in the seam was is sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 82%. After the voltage of 1V was applied, the device acquired the black color, while light transmission was 10%, and the time of coloring/discoloration was 1.5 and 2 minutes, respectively. When the device was conditioned under the UV light from DRS-250 lamp for 30 minutes, no changes were registered. When the device was opened, the electrochromic layer looked like a solid-state polymer film.

EXAMPLE 5

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
an anodic electrochromic component: 0.008M of 5,10-dihydro-5,10-dimethyl phenazine,
a cathodic electrochromic component: 0.010M of 1,1'-dibenzyl-4,4'-dipyridinium diperchlorate and 0.0030M of 1,1"-(1,3-propanediyl)bis[1'-methyl-4,4'bipyridinium] tetraperchlorate,
an indifferent electrolyte: 0.015M of lithium perchlorate and 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
a plasticizer: 3 Vol. % of diethyl phthalate,
an antioxidant: 0.001M of ionol.
an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 82%. After the voltage of 1V was applied, the device acquired the black color, while light transmission was 10%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 6

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer. The electrochromic solution included:
an inert aprotic solvent: 50 Vol. % of propylene carbonate,
a methacrylic unsaturated oligomer-monomer composition: 45 Vol. % of Acrolat 18,
an anodic electrochromic component: 0.008M of 5,10-dihydro-5,10-dimethyl phenazine, a cathodic electrochromic component: 0.010M of 1,1'-dibenzyl-4,4'-dipyridinium diperchlorate and 0.0030M of 1,1"-(1,3-propanediyl)bis[1'-methyl-4,4'bipyridinium] tetraperchlorate, an indifferent electrolyte: 0.015M of sodium perchlorate, 0.005M tetrabutyl ammonium perchlorate and 0.015M of sodium tetrafluoroborate, a photo initiator: 0.005M of 2,2-dimethoxy-1,2-diphenylethane-1-on, an adhesive: 2 Vol. % of 3-methacryloxypropyl trimethoxysilane, a plasticizer: 3 Vol. % of diethyl phthalate, an antioxidant: 0.001M of ionol an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 82%. After the voltage of 1V was applied, the device acquired the black color, while light transmission was 10%, and the time of coloring/discoloration was 1.5 and 2 minutes, respectively. When the device was conditioned under the UV light from DRS-250 lamp for 30 minutes, no changes were registered. When the device was opened, the electrochromic layer looked like a solid-state polymer film.

EXAMPLE 7

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:

an inert aprotic solvent: 50 Vol. % of propylene carbonate a methacrylic unsaturated oligomer-monomer composition: 45 Vol. % of Acrolat 18, a polymer: 10 Vol. % polymethyl methacrylate, an anodic electrochromic component: 0.008M of 5,10-dihydro-5,10-dimethyl phenazine, a cathodic electrochromic component: 0.010M of 1,1'-dibenzyl-4,4'-dipyridinium diperchlorate and 0.0030M of 1,1"-(1,3-propanediyl)bis[1'-methyl-4,4'bipyridinium] tetraperchlorate, an indifferent electrolyte: 0.015M of lithium perchlorate, 0.005M tetrabutyl ammonium perchlorate, a photo initiator: 0.005M of 2,2-dimethoxy-1,2-diphenylethane-1-on, an adhesive: 2 Vol. % of 3-methacryloxypropyl trimethoxysilane, a plasticizer: 3 Vol. % of diethyl phthalate, an antioxidant: 0.001M of ionol.

an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 81%. After the voltage of 1V was applied, the device acquired the black color, while light transmission was 10%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 8

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:

an inert aprotic solvent: 50 Vol. % of propylene carbonate a methacrylic unsaturated oligomer-monomer composition: 45 Vol. % of Acrolat 18, a polymer: 10 Vol. % polymethyl methacrylate, an anodic electrochromic component: 0.008M of 5,10-dihydro-5,10-dimethyl phenazine, a cathodic electrochromic component: 0.010M of 1,1'-dibenzyl-4,4'-dipyridinium diperchlorate and 0.0030M of 1,1"-(1,3-propanediyl)bis[1'-methyl-4,4'bipyridinium] tetraperchlorate, an indifferent electrolyte: 0.015M of sodium perchlorate, 0.005M tetrabutyl ammonium perchlorate and 0.015M of sodium tetrafluoroborate, a photo initiator: 0.005M of 2,2-dimethoxy-1,2-diphenylethane-1-on, an adhesive: 2 Vol. % of 3-methacryloxypropyl trimethoxysilane, a plasticizer: 3 Vol. % of diethyl phthalate, an antioxidant: 0.001M of ionol, an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 81%. After the voltage of 1V was applied, the device acquired the black color, while light transmission was 10%, and the time of coloring/discoloration was 1.5 and 2 minutes, respectively. When the device was conditioned under the UV light from DRS-250 lamp for 30 minutes, no changes were registered. When the device was opened, the electrochromic layer looked like a solid-state polymer film.

EXAMPLE 9

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
a polymer: 10 Vol. % polymethyl methacrylate,
an anodic electrochromic component: 0.008M of 5,10-dihydro-5,10-dimethyl phenazine,
a cathodic electrochromic component: 0.015M of 1,1'-dibenzyl-4,4'-dipyridinium diperchlorate,
an indifferent electrolyte: 0.015M of lithium perchlorate, 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
a plasticizer: 3 Vol. % of diethyl phthalate,
an antioxidant: 0.001M of ionol,
an optic brightener: 0.001M of terphenyl.

The internal volume of the device was filled with the original electrochromic solution under pressure. After filling, the opening in the seam was sealed with butyl rubber and polysulfide sealing agent, The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 79%, After the voltage of 1V was applied, the device acquired the black color, while light transmission was 10%, and the time of coloring/discoloration was 1 and 3 minutes, respectively, When the device was conditioned under the UV light from DRS-250 lamp for 30 minutes, no changes were registered. When the device was opened, the electrochromic layer looked like a solid-state polymer film.

EXAMPLE 10

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
a polymer: 10 Vol. % polymethyl methacrylate,
an anodic electrochromic component: 0.005M of ferrocene,
a cathodic electrochromic component: 0.010M of 1,1'-dibenzyl-4,4'-dipyridinium diperchlorate,
an indifferent electrolyte: 0.015M of lithium perchlorate, 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
a plasticizer: 3 Vol. % of diethyl phthalate,
an antioxidant: 0.001M of ionol.
an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 79%. After the voltage of 1.2V was applied, the device acquired the blue color, while light transmission was 20%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 11

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
a polymer: 10 Vol. % polymethyl methacrylate,
an anodic electrochromic component: 0.005M of ferrocene,
a cathodic electrochromic component: 0.016M of 1,1'-dibenzyl-4,4'-dipyridinium diperchlorate,
an indifferent electrolyte: 0.015M of lithium perchlorate, 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
a plasticizer: 3 Vol. % of diethyl phthalate,
an antioxidant: 0.001M of ionol,
an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 79%. After the voltage of 1,2V was applied, the device acquired the purple color, while light transmission was 15%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

EXAMPLE 12

An electrochromic device has been manufactured, said device comprising two optically transparent ITO electrodes, having surface resistance of 30 Ohm/square, the thickness of the glass liner being 4 mm. The size of the electrodes was 148×210 mm. The inter-electrode space was formed by a butyl ac rubber-based sealing compound; 0.4 mm thick nylon twine was used as spacer.

The electrochromic solution included:
an inert aprotic solvent: 50 Vol. % of propylene carbonate
a methacrylic unsaturated oligomer-monomer composition: 45 Vol. % of Acrolat 18,
a polymer: 10 Vol. % polymethyl methacrylate,
an anodic electrochromic component: 0.008M of 5,10-dihydro-5,10-dimethyl phenazine,
a cathodic electrochromic component: 0.0033M of 1,1"-(1,3-propanediyl)bis[1'-methyl-4,4'bipyridinium] tetraperchlorate,
an indifferent electrolyte: 0.015M of lithium perchlorate, 0.005M tetrabutyl ammonium perchlorate,
a photo initiator: 0.005M of 2,2-dimethoxy-1,2-diphenylethane-1-on,
an adhesive: 2 Vol. % of 3-methacryloxypropyl trimethoxysilane,
a plasticizer: 3 Vol. % of diethyl phthalate,
an antioxidant: 0.001M of ionol,
an optic brightener: 0.001M of terphenyl.

The internal volume of the device was filled with the original electrochromic solution under pressure. After filling, the opening in the seam was sealed with butyl rubber and polysulfide sealing agent.

The filled device was conditioned for 90 minutes under ultraviolet light, radiation intensity being 10 W/m2 in the range of 320-400 nm, then in the thermal chamber at 70° C. Light transmission of the device in the visible spectrum range before and after radiation was 80%. After the voltage of 1V was applied, the device acquired the brown color, while light transmission was 10%, and the time of coloring/discoloration was 1 and 3 minutes, respectively. When the device was conditioned under the UV light from DRS-250 lamp for 30 minutes, no changes were registered. When the device was opened, the electrochromic layer looked like a solid-state polymer film.

The tests of industrial prototypes of the device according to Examples 1-12 demonstrated that these devices are electrochromic devices resistant to degradation processes initiated by sunlight, with their light transmission up to 82% and service life exceeding that of the similar devices (up to 5 years).

Therefore, the invention reaches the technical objective, namely, to increase service life of the electrochromic device.

An additional technical result is increased plasticity and resilience of the polymer matrix.

The invention claimed is:

1. An electrochromic device comprising two electrodes, at least one of which is optically transparent, the electrodes forming an enclosed space filled with a solid-state electrochromic layer comprising a crosslinked polymer matrix formed by polymerization of a solution which includes
an aprotic inert solvent,
an unsaturated oligomer-monomer composition,
a cathodic electrochromic component,
an anodic electrochromic component,
a photo initiator,
an adhesive,
indifferent electrolytes,
an optical brightener selected from the group consisting of aromatic series, heterocyclic series., and mixtures of two or more thereof, wherein the optical brightner increase a light transmission of the electrochromic device in the visible spectrum,
an antioxidant selected from the group consisting of sterically hindered phenols and mixtures of two or more thereof, the antioxidant being adapted to protect electrochromic compounds from oxidants,
a polymer selected from the group consisting of polystyrene, polymethyl methacrylate, polyethylene terephthalate, polyvinyl pyrrolidone, derivatives thereof, and mixtures of two or more thereof, wherein the polymer increases plasticity and resilience of the crosslinked polymer matrix, and
a plasticizer selected from the group consisting of crown ethers, phthalic acid ethers, and mixtures of two or more thereof, wherein the plasticizer increases plasticity, resilience and ion conductivity of the crosslinked polymer matrix.

2. The electrochromic device according to claim 1, wherein the solution comprises the optical brightener in the range from 0.001M to 0.002M.

3. The electrochromic device according to claim 1, wherein the solution comprises the antioxidant in the range from 0.001M to 0.002M.

4. The electrochromic device according to claim 1, wherein the solution comprises the polymer in the range from 1 Vol. % to 20 Vol. %.

5. The electrochromic device according to claim 1, wherein the solution comprises the plasticizer in the range from 1 Vol. % to 5 Vol. %.

6. A method of manufacturing of an electrochromic device comprising two electrodes, at least one of which is optically transparent, the method including:
obtaining a true electrochromic solution of a cathodic electrochromic component, an anodic electrochromic component, a photo initiator, an adhesive, an indifferent electrolyte, an unsaturated oligomer-monomer composition, an optical brightener selected from the group consisting of aromatic series, heterocyclic series, and mixtures of two or more thereof, wherein the optical brightener increases a light transmission of the electrochromic device in the visible spectrum, an antioxidant selected from the group consisting of sterically hindered phenols and mixtures of two or more thereof, a polymer selected from the group consisting of polystyrene, polymethyl methacrylate, polyethylene terephthalate, polyvinyl pyrrolidone, derivatives thereof, and mixtures of two or more thereof, wherein the polymer increases plasticity and resilience of the a crosslinked polymer matrix, and a plasticizer selected from the group consisting of crown ethers, phthalic acid ethers, and mixtures of two or more thereof, wherein the plasticizer increases plasticity and resilience of the crosslinked polymer matrix, in an inert aprotic solvent, filling an enclosed space between the electrodes with the true electrochromic solution, creating the sealed enclosed space between the electrodes filled with the true electrochromic solution, polymerizing the electrochromic solution by an electromagnetic radiation in the visible and/or ultraviolet spectral range to ensure a transition of molecules of at least one of the electrochromic components to an excited state and a transition of oxygen from a free active state into a bound inactive state, thermally influencing the activated true electrochromic solution to obtain a solid- state electrochromic layer comprising a the crosslinked polymer matrix with the filler in the form of the electrochromic solution.

7. The method according to claim 6, wherein the solution comprises the optical brightener in the range from 0.001M to 0.002M.

8. The method according to claim 6, wherein the solution comprises the antioxidant in the range from 0.001M to 0.002M.

9. The method according to claim 6, wherein the solution comprises the polymer in the range from 1 Vol. % to 20 Vol. %.

10. The method according to claim 6, wherein the solution comprises the plasticizer in the range from 1 Vol. % to 5 Vol. %.

11. The method according to claim 9, wherein the solution comprises the polymer in the range from 5 Vol. % to 10 Vol. %.

12. The method according to claim 10, wherein the unsaturated oligomer-monomer composition comprises an acrylic unsaturated oligomer-monomer composition and/or methacrylic unsaturated oligomer-monomer composition from 30 Vol. % to 70 Vol. %.

13. The electrochromic device according to claim 4, wherein the solution comprises the polymer in the range from 5 Vol. % to 10 Vol. %.

14. The electrochromic device to claim 5, wherein the unsaturated oligomer-monomer composition comprises an acrylic unsaturated oligomer-monomer composition and/or methacrylic unsaturated oligomer-monomer composition from 30 Vol. % to 70 Vol. %.

\* \* \* \* \*